(No Model.)
V. P. TRAVERS.
HAMMOCK.
No. 363,096. Patented May 17, 1887.
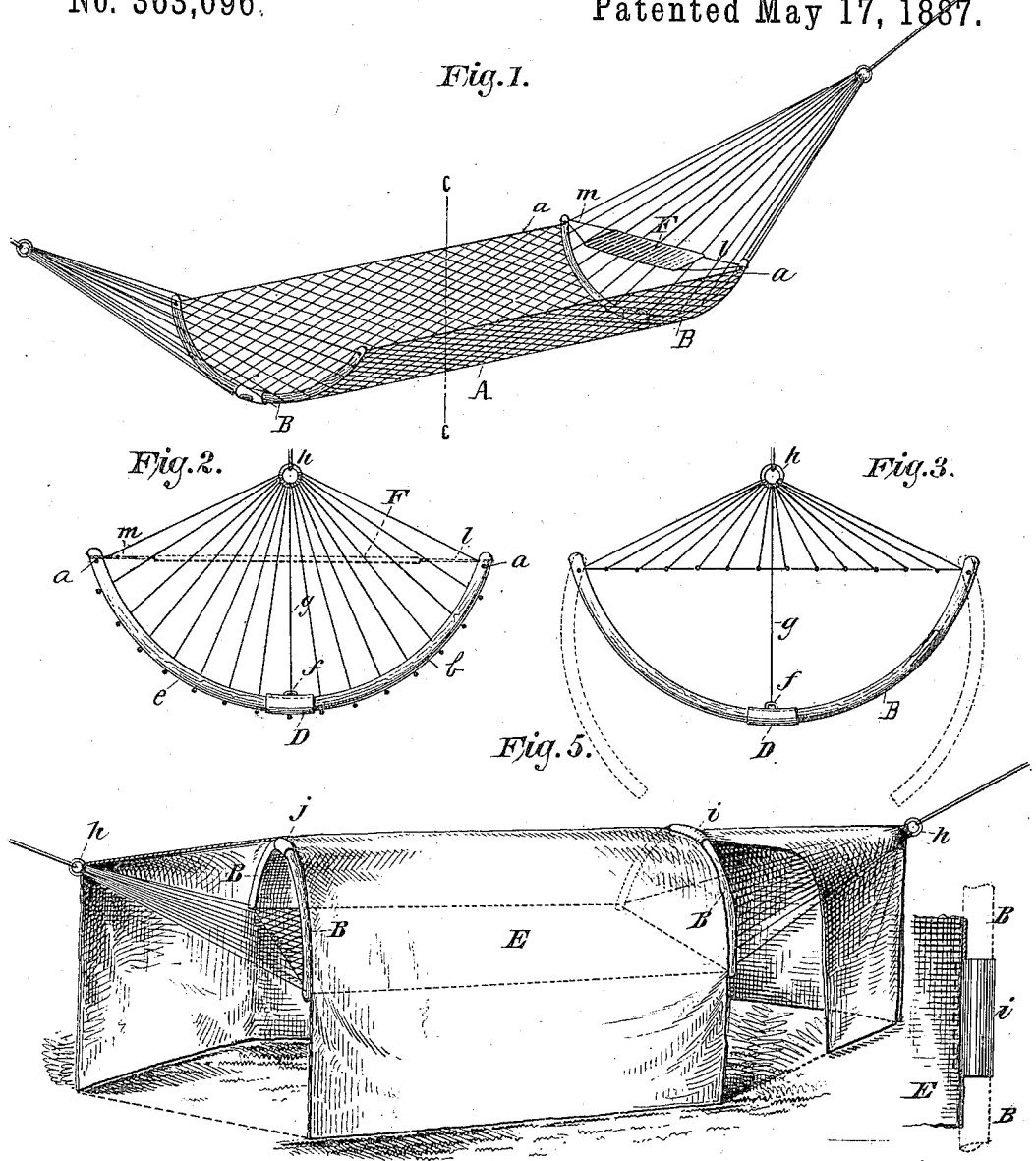
WITNESSES:
Gustave Dieterich
N. J. Stockwell
INVENTOR
Vincent P. Travers
BY
Briesen & Steele,
his
ATTORNEYS

UNITED STATES PATENT OFFICE.

VINCENT P. TRAVERS, OF NEW YORK, N. Y.

HAMMOCK.

SPECIFICATION forming part of Letters Patent No. 363,096, dated May 17, 1887.

Application filed December 8, 1886. Serial No. 220,949. (No model.)

*To all whom it may concern:*

Be it known that I, VINCENT P. TRAVERS, a resident of New York city, in the county and State of New York, have invented an Improvement in Hammocks, of which the following is a full, clear, and exact description, reference being made to the accompanying drawings.

My invention relates to hammocks; and it consists in providing the hammock with a canopy and with a spreader, which may serve either as support for the canopy or as a brace or spreader for the hammock, as will be more fully hereinafter set forth.

In the accompanying drawings, Figure 1 is a perspective view of a hammock with a part of my invention applied thereto. Fig. 2 is a vertical section on the line *c c*, Fig. 1. Fig. 3 shows the position of the spreader when serving as a brace for the hammock. Fig. 4 is a vertical section through the sleeve which unites the two parts of the spreader. Fig. 5 is a view showing the manner of attaching the canopy to the hammock. Figs. 6 and 7 show ways of attaching a thimble or socket to the canopy.

A is the hammock, which is of suitable construction.

B B are the spreaders, which are attached to the outer cords, *a a*, of the hammock by passing the cords *a a* through holes in the ends of the spreaders, as in Fig. 2. These spreaders are composed each of two parts, *b* and *e*, held together by a socket or thimble, D. (See Fig. 4.) This socket or thimble D has secured to it an eye, *f*, to which is attached a cord, *g*, which cord *g* is secured at its opposite end to the supporting-ring *h* or other part of the hammock and serves as a support for the thimble D of the spreader. When the spreaders B B are to be used to spread the hammock, they are turned above the hammock to the position shown in Fig. 2—that is, with the arch downward—in which position all of the cords of the hammock, except the outer cords, *a a*, will be under the spreader and the hammock kept in its expanded position. If the hammock is not to be expanded, the spreaders B B may hang under the hammock and serve as a brace, as shown in Fig. 3. When the spreaders are not to be used, they will hang suspended from the cords *a*, as shown by dotted lines in Fig. 3.

The canopy attachment consists of a canvas cover, E, which may be of such shape as to entirely inclose the hammock, or to cover only the body part of the hammock, as indicated in Fig. 5. This cover E has thimbles or sockets *i* and *j*, suitably secured thereto, into which thimbles or sockets fit the ends of the parts *b* and *e* of the spreaders B B when the latter are turned with the arch upward. This gives a firm support for the canopy, which support is carried by the hammock.

F is the head-rest, which is attached to the hammock by loops *l* and *m*, secured to each end of the rest and passing over and around the ends of the spreader B, Figs. 1 and 2. This construction of rest does not require additional fixtures on the spreader as heretofore.

My improved hammock has the advantage that it may be used as a pleasure hammock, and also that it may be converted at any time into a very comfortable form of camping tent. The spreaders being always connected with the hammock cannot be misplaced, and are ready to be turned into either of the three positions shown in Figs. 2, 3, and 5.

I do not broadly claim a sectional spreader, nor one having a series of loops for connecting with the hammock throughout. Nor do I claim a continuous elastic spreader, nor anything shown in Patents Nos. 339,345 and 329,690.

Having now described my invention, what I claim is—

1. A hammock-spreader made in two parts, each of which is swiveled at its outer end to the outer cords of the hammock, thereby rendering each part of the spreader reversible, in combination with said hammock, substantially as herein shown and described.

2. A hammock-spreader made in two parts, each of which is swiveled at its outer end to the outer cords of the hammock, the other cords of the hammock being disconnected from the spreader, in combination with the thimble D, carried separately by the hammock, into which the inner ends of the spreader fit, substantially as described.

3. The combination, with a hammock and spreaders, the ends of which spreaders are attached to said hammock by the outer cords only, said cords passing through holes in the outer ends of said spreaders, of a canopy having sockets, all arranged so that said spreaders, when turned up, will support and hold the canopy in position, substantially as herein shown and described.

4. The combination of a hammock, a canopy having sockets $j$ and $i$, and two-part spreader B, engaging said sockets and connected at their outer ends to the hammock, substantially as described.

VINCENT P. TRAVERS.

Witnesses:
GUSTAV SCHNEPPE,
HARRY M. TURK.